(12) United States Patent
Phi (10) Patent No.: US 10,689,120 B2
(45) Date of Patent: Jun. 23, 2020

(54) STOWABLE REVERSIBLE SEAT (71) Applicant: Textron Aviation Inc., Wichita, KS (US)

(72) Inventor: Thang Chien Phi, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 238 days.

(21) Appl. No.: 15/689,301

(22) Filed: Aug. 29, 2017

(65) Prior Publication Data
US 2018/0057169 A1 Mar. 1, 2018

Related U.S. Application Data (60) Provisional application No. 62/380,733, filed on Aug. 29, 2016.

(51) Int. Cl.
*B64D 11/06* (2006.01)
*B60N 2/14* (2006.01)
*B60N 2/30* (2006.01)

(52) U.S. Cl.
CPC .......... *B64D 11/0696* (2013.01); *B60N 2/143* (2013.01); *B60N 2/30* (2013.01); *B60N 2/305* (2013.01); *B60N 2/3013* (2013.01); *B60N 2/3025* (2013.01); *B60N 2/3059* (2013.01); *B64D 11/0639* (2014.12); *B64D 11/0691* (2014.12)

(58) Field of Classification Search
CPC ............ B64D 11/0639; B64D 11/0691; B64D 11/0969; B64D 11/0696; B60N 2/04; B60N 2/143; B60N 2/30; B60N 2/3059; B60N 2/3034; B60N 2/3065

USPC .......... 297/14, 92, 94, 335, 354.13, 378.12, 297/440.15; 244/118.6; 312/235.3
See application file for complete search history.

(56) References Cited

U.S. PATENT DOCUMENTS 4,736,985 A * 4/1988 Fourrey ............... B60N 2/0292
296/69
4,740,030 A * 4/1988 Nordskog ................ A47C 9/06
16/289

(Continued)

FOREIGN PATENT DOCUMENTS

| CA | 2560674 A1 * 10/2005 ........... B60N 2/3011 |
| JP | 61081829 A * 4/1986 |
| WO | WO-02100678 A1 * 12/2002 |

*Primary Examiner* — Robert Canfield
(74) *Attorney, Agent, or Firm* — Erise IP, P.A.

(57) ABSTRACT

A stowable reversible seat for a vehicle includes a first member pivotally coupled to a floor for supporting a seat base, a second member releasably secured to the floor for supporting the seat base, and a seat back pivotally coupled to the first member. Components of the seat pivot between a folded configuration for stowing and a deployed configuration for seating. The orientation of the seat may be reversed for switching between a forward-facing direction and an aft-facing direction. A method of configuring a seat into an aircraft includes adapting a cabinet area to receive and conceal the seat, configuring a rail to make the seat slidable out from the cabinet area into an aisle, attaching a pivotable seat base on the seat, and pivotally mounting a supporting leg underneath a portion of the seat to secure the pivotable seat base in a substantially horizontal position.

21 Claims, 13 Drawing Sheets (56) References Cited

U.S. PATENT DOCUMENTS

| | | | | |
|---|---|---|---|---|
| 4,993,666 | A * | 2/1991 | Baymak | B09B 1/00 244/122 R |
| 5,707,103 | A * | 1/1998 | Balk | B60N 2/01583 297/13 |
| 5,797,649 | A * | 8/1998 | Snell, Jr. | B60N 2/3043 296/63 |
| 6,460,922 | B1 * | 10/2002 | Demick | B60N 2/3034 296/65.11 |
| 6,981,744 | B2 * | 1/2006 | Elterman | B60N 2/01583 296/65.09 |
| 6,991,285 | B1 * | 1/2006 | Hemenway | B60N 2/203 296/65.01 |
| 7,040,702 | B2 * | 5/2006 | Yamada | B60N 2/3009 296/65.01 |
| 7,644,982 | B2 * | 1/2010 | Paluch | B60N 2/853 297/95 |
| 8,434,808 | B2 * | 5/2013 | Abe | B60N 2/3013 296/65.03 |
| 8,465,096 | B2 * | 6/2013 | Sayama | B60N 2/3011 297/378.14 |
| 8,708,392 | B2 * | 4/2014 | Otsuka | B60N 2/3011 296/65.05 |
| 8,770,659 | B2 * | 7/2014 | Isherwood | B64D 11/0691 297/14 |
| 9,150,178 | B1 * | 10/2015 | Jayasuriya | B60R 22/023 |
| 9,199,740 | B2 * | 12/2015 | Ehlers | B64D 11/0691 |
| 9,789,793 | B2 * | 10/2017 | Abe | B60N 2/3065 |
| 10,040,378 | B2 * | 8/2018 | Hansen | B60N 2/3065 |
| 2003/0184129 | A1 * | 10/2003 | Honda | B60N 2/3011 297/14 |
| 2003/0218348 | A1 * | 11/2003 | Yoshino | B60N 2/3013 296/65.09 |
| 2004/0041431 | A1 * | 3/2004 | Ito | B60N 2/3013 296/65.05 |
| 2004/0239137 | A1 * | 12/2004 | Buccinna | B60N 2/3013 296/65.09 |
| 2005/0057081 | A1 * | 3/2005 | Kahn | B60N 2/3013 297/331 |
| 2006/0138836 | A1 * | 6/2006 | Yudovich | B60N 2/3047 297/335 |
| 2009/0189408 | A1 * | 7/2009 | DeVoss | B60N 2/0232 296/65.08 |
| 2009/0277372 | A1 * | 11/2009 | Wood | B60N 2/203 114/363 |
| 2014/0319275 | A1 * | 10/2014 | Najd | B64D 11/02 244/118.6 |
| 2015/0232185 | A1 * | 8/2015 | Johnson | B64D 11/0691 297/14 |
| 2015/0284097 | A1 * | 10/2015 | Schliwa | B64D 11/0691 244/118.6 |
| 2016/0046210 | A1 * | 2/2016 | Nakamura | B60N 2/065 297/344.1 |
| 2018/0009534 | A1 * | 1/2018 | Joffre | B64D 11/06 |
| 2018/0312258 | A1 * | 11/2018 | Itzinger | B64D 11/06 |

* cited by examiner

STOWABLE REVERSIBLE SEAT

CROSS-REFERENCE TO RELATED APPLICATIONS

This application claims the benefit of U.S. Provisional Application No. 62/380,733 entitled "Stowable Reversible Seat" filed on Aug. 29, 2016, which is herein incorporated by reference in its entirety.

BACKGROUND

1. Field

Embodiments of this disclosure relate generally to stowable seats for use onboard vehicles, and more specifically to a stowable seat that is reversible between a forward orientation and an aft orientation.

2. Description of the Related Art

U.S. Pat. No. 8,770,659 to Isherwood et al. discloses a self-stowing aircraft jumpseat that includes a spring loaded seat and a retraction mechanism that automatically retracts the seat into a bulkhead when unoccupied.

U.S. Patent Application No. 2014/0319275 to Najd et al. discloses a stowable aircraft seat including a seat that pivots up and down for closed and open positions, respectively. The seat back is connected to a hinge pin for rotating the seat to face out of the stowage compartment when deployed.

U.S. Patent Application No. 2015/0284097 to Schliwa et al. discloses an apparatus for holding an attendant seat in a vehicle cabin that includes linear movement mechanisms for moving the seat to discrete positions to fold against a wall.

SUMMARY

In an embodiment, a stowable reversible seat for a vehicle is provided. The seat includes a first member pivotally coupled to a floor for supporting a seat base; a second member releasably secured to the floor for supporting the seat base; and, a seat back pivotally coupled to the first member, wherein the first member, the second member, the seat base, and the seat back pivot between a folded configuration for stowing and a deployed configuration for seating.

In another embodiment, a method of configuring a seat into an aircraft is provided. The aircraft may have a concealed cabinet area and an aisle to provide an egress path for a pilot. The method includes adapting the cabinet area to receive and conceal the seat; configuring a rail to make the seat slidable out from the cabinet area into the aisle; establishing a releasable locking mechanism for enabling the seat to be secured inside the cabinet or in the aisle, and for the seat to slide between the cabinet area and the aisle; attaching a pivotable seat base on the seat; and, pivotally mounting a supporting leg underneath a portion of the seat to secure the pivotable seat base in a substantially horizontal position.

In yet another embodiment, a stowable reversible seat for a vehicle is provided. The seat includes a track extending along a floor of the vehicle between a compartment and an aisle; a forward leg member supporting a flip-down seat base, the forward leg member being slidably received into the track such that the seat can either be stowed in the compartment or slid out into a deployed position; a seat back that locks into an upright position for seating; and, a rear leg member hinged to one of the forward leg member or the seat base, the rear leg member being plantable in a relatively rearward location on a support surface, the rear leg member thus providing rearward support for the seat when the seat is in the deployed position.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure include a seat for use onboard a vehicle that is stowable inside a compartment. The seat is configured for deploying outside the compartment where it may be unfolded and secured in place for use. The seat is reversible, allowing it to face either forward or aft and may be quickly lowered into an egress position to provide an egress path in case of emergency. The seat may include a strut configured to automatically fold the seat for stowing when released. Description is provided below of the various embodiments in connection with the drawings of FIGS. 1-13.

Figure 1:
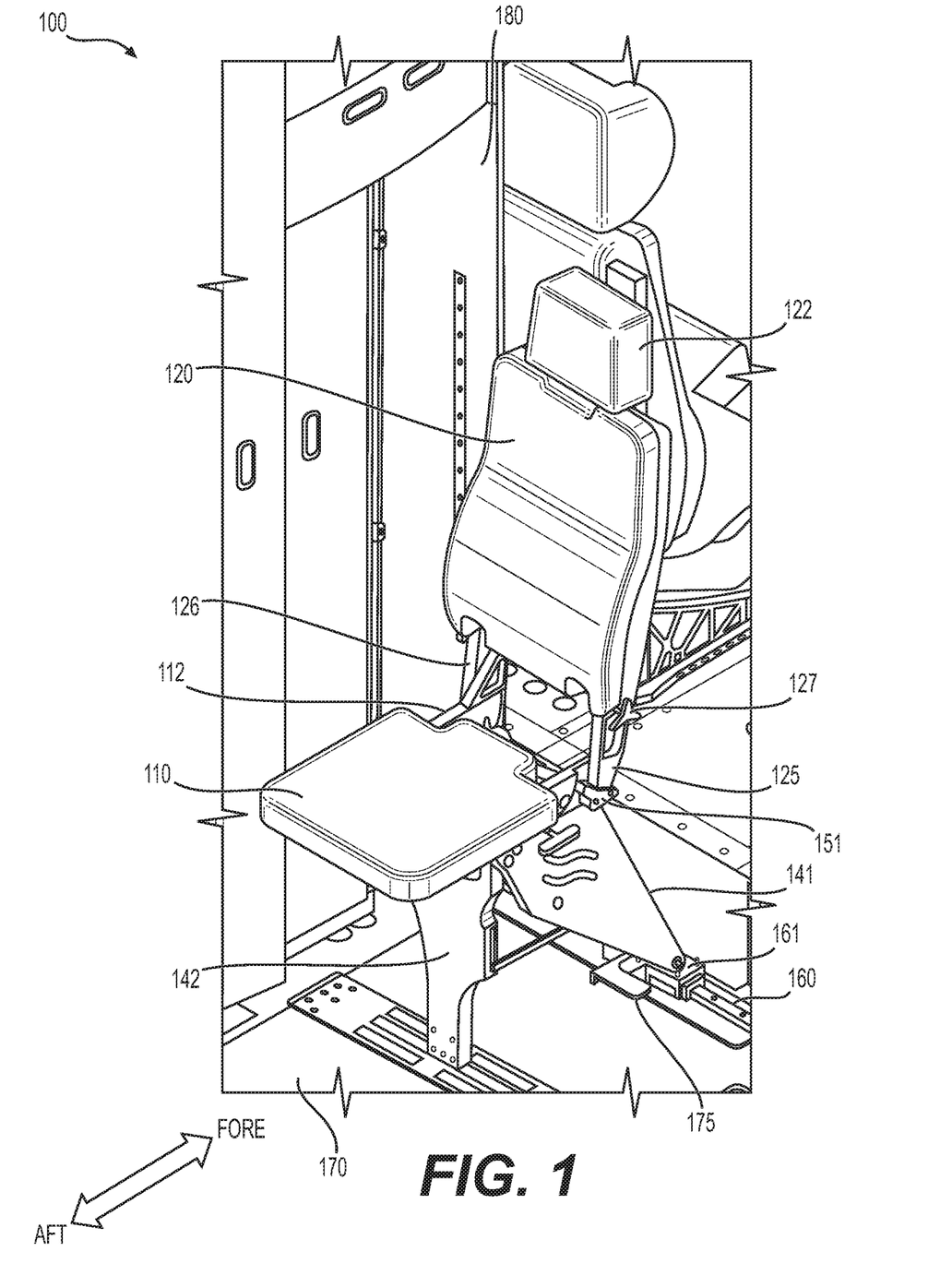
FIG. 1 is a perspective view of a stowable reversible seat deployed for sitting in an aft-facing direction, in an embodiment.

FIG. 1 is a perspective view of a stowable reversible seat 100 deployed for sitting in an aft-facing direction (e.g., a rearward-facing direction). Seat 100 includes a seat base 110, a seat back 120, and a headrest 122 configured for sitting. In an embodiment, seat 100 is configured for sitting by an attendant during takeoff and landing of an aircraft.

Figure 4:
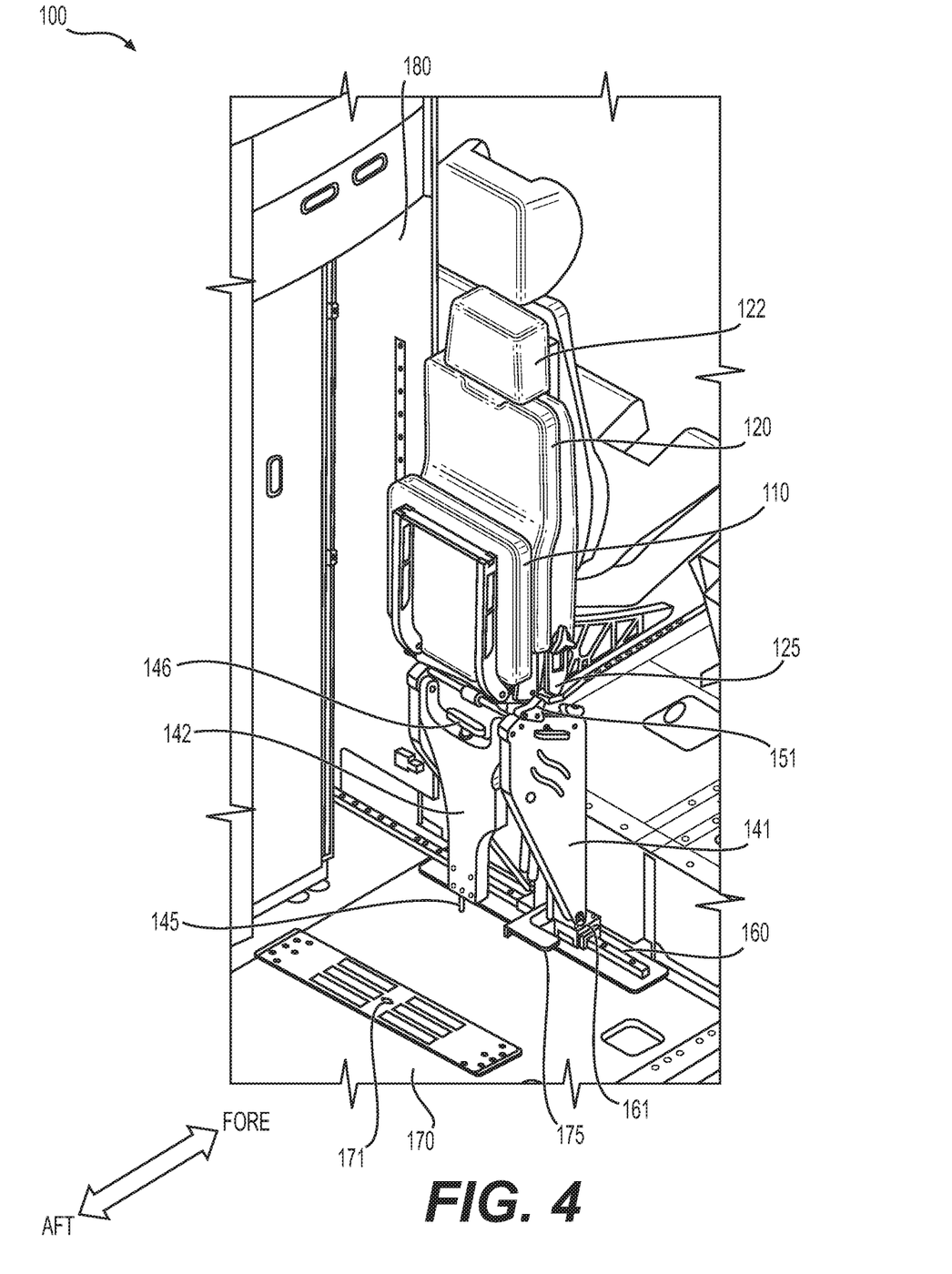
FIG. 4 is a perspective view of the stowable reversible seat of FIG. 1 folded for stowing in an aft-facing direction, in an embodiment.

A first leg 141 and a second leg 142 support seat base 110 and the weight of a passenger seated on seat base 110 above a floor 170. A first end of first leg 141 pivotally couples to a carriage plate 161, which enables pivoting of first leg 141 between a deployed angle for seating (e.g., as depicted in FIG. 1) and a substantially vertical or upright orientation for stowing (e.g., as depicted in FIG. 4). Seat base 110 and seat back 120 pivotally couple to a seat frame 112 such that seat base 110 may flip up/down for stowing/seating and seat back may pivot between upright, reclined or egress positions. A second end of first leg 141, opposite the first end, pivotally couples to seat frame 112. Second leg 142 includes a member with a first end positioned on floor 170 and a second end pivotally coupled to the second end of first leg 141. Second leg 142 is securable to floor 170 via a retractable member that protrudes from the first end for inserting into a hole in floor 170, as further described below in connection with FIG. 4.

In certain embodiments, first leg 141 pivotally couples to seat frame 112 along the outboard sides of seat base 110. First leg 141 may be formed of a single member coupled at its first end to carriage plate 161 via one or more mounts (see e.g., FIG. 6) and at its second end to seat base 110 and seat back 120 via one or more pivot points and seat frame 112. For example, the single member embodiment of first leg 141 may include a V-shaped, U-shaped, or H-shaped member. Alternatively, first leg 141 may include more than one member, which may optionally be braced together (e.g., to form a V-shaped, U-shaped, or H-shaped member).

Carriage plate 161 is mounted for sliding along a track or rail 160 that is secured to the floor 170. Sliding of carriage plate 161 enables seat 100 to be slid into and out of a compartment 180 as described below in connection with FIGS. 4 and 5. Compartment 180 is for example a stowage compartment, a cabinet area, or a closet configured to securely stow seat 100. Rail 160 may have a similar or slightly lower height compared to a thickness of carpet installed on the floor (not shown) to avoid posing a tripping hazard. A foot lever 175 may be used to release a locking pin through carriage plate 161 that engages rail 160 for securing thereto, as further described below in connection with FIG. 6.

Seat back 120 includes a first stay 125 and a second stay 126 that protrude from opposite sides of seat back 120 and are longitudinally-aligned with seat back 120. First stay 125 and second stay 126 may each include a pointed end that engages in one or more holes or notches of a block mechanically coupled to first leg 141. For example, the pointed end of first stay 125 engages a hole in a first block 151. When engaged, the pointed end prevents rotation of first stay 125. Release of the pointed end to disengage first stay 125 is actuated via a release lever 127 coupled to a retractable member at the pointed end of first stay 125. Retracting the pointed end of first stay 125 enables pivoting of first stay 125 for tilting seat back 120. Seat back 120 may be tilted to another orientation such as an upright, reclined or egress orientation. Alternatively, first block 151 may be configured to rotate for releasing the pointed end of first stay 125.

In an embodiment, the pointed end of first stay 125 includes a retractable pin and first block 151 is a pin block configured with at least one slot for receiving the retractable pin. For example, a first slot provides an upright orientation and one or more additional slots provide one or more reclined orientations, respectively. First release lever 127 may be actuated by a user pressing or pulling on a lever coupled to the retractable pin via a cable, for example. Second stay 126 may similarly engage a second block not visible in FIG. 1 on an opposite side of first leg 141 and may be disengaged via first release lever 127 or a second release lever 128 (see e.g., FIG. 8) located on second stay 126. First release lever 127 and second release lever 128 may be rotationally coupled or independently actuated without departing from the scope hereof.

Figure 2:
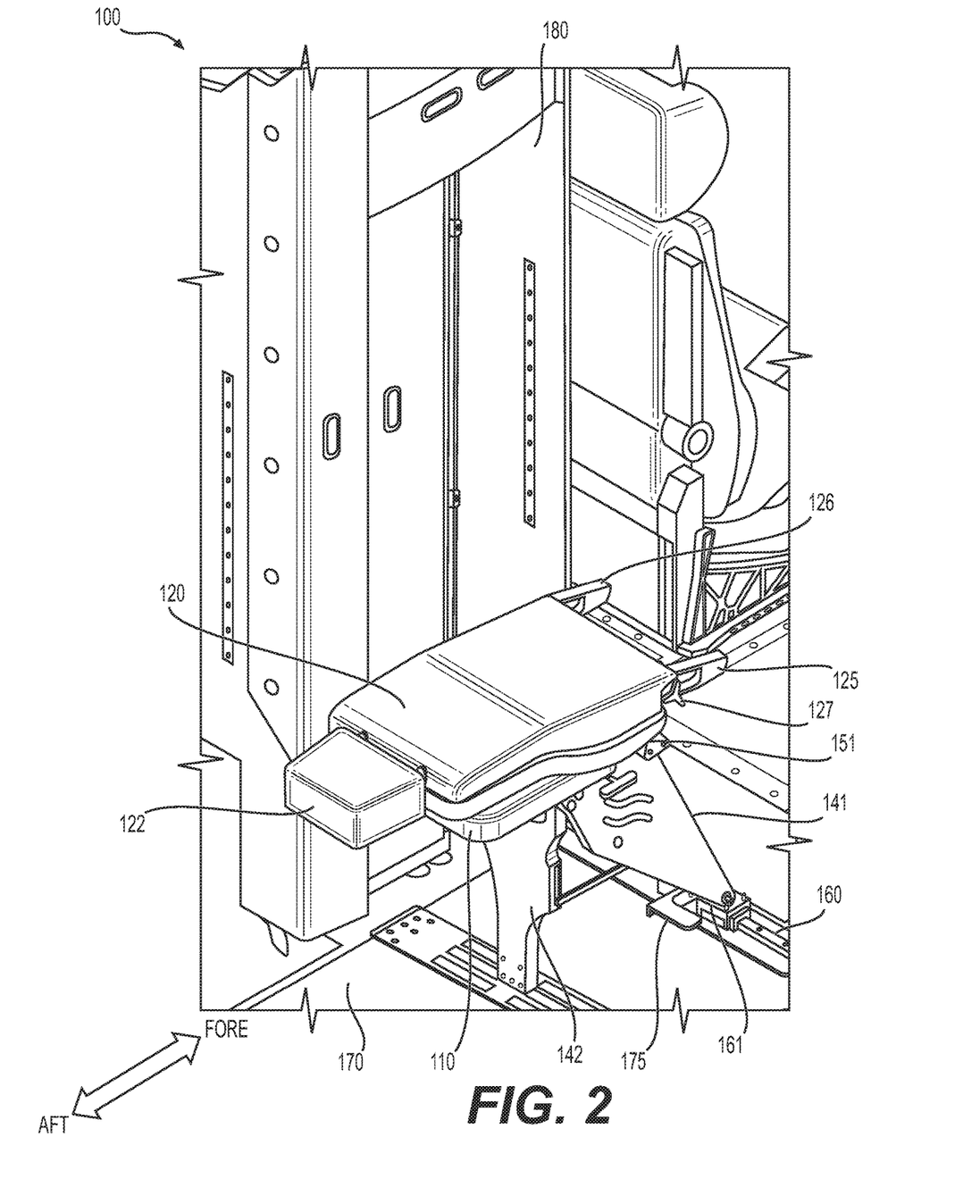
FIG. 2 is a perspective view of the stowable reversible seat of FIG. 1 deployed in an aft-facing direction with the seat back lowered into a first egress position, in an embodiment.

FIG. 2 is perspective view of stowable reversible seat 100, FIG. 1 deployed in an aft-facing direction with seat back 120 lowered into a first egress position. The first egress position is marked by seat back 120 laying on top of seat base 110. An egress configuration of seat 100 is important for providing a safe egress path in case of emergency. In certain embodiments, seat 100 is intended to be deployed in aircraft aisle during takeoff and landing Therefore, rapid conversion of seat back 120 from an upright or reclined position to an egress position allows a pilot, co-pilot, or passenger to quickly climb over the seat to exit the aircraft.

Figure 3:
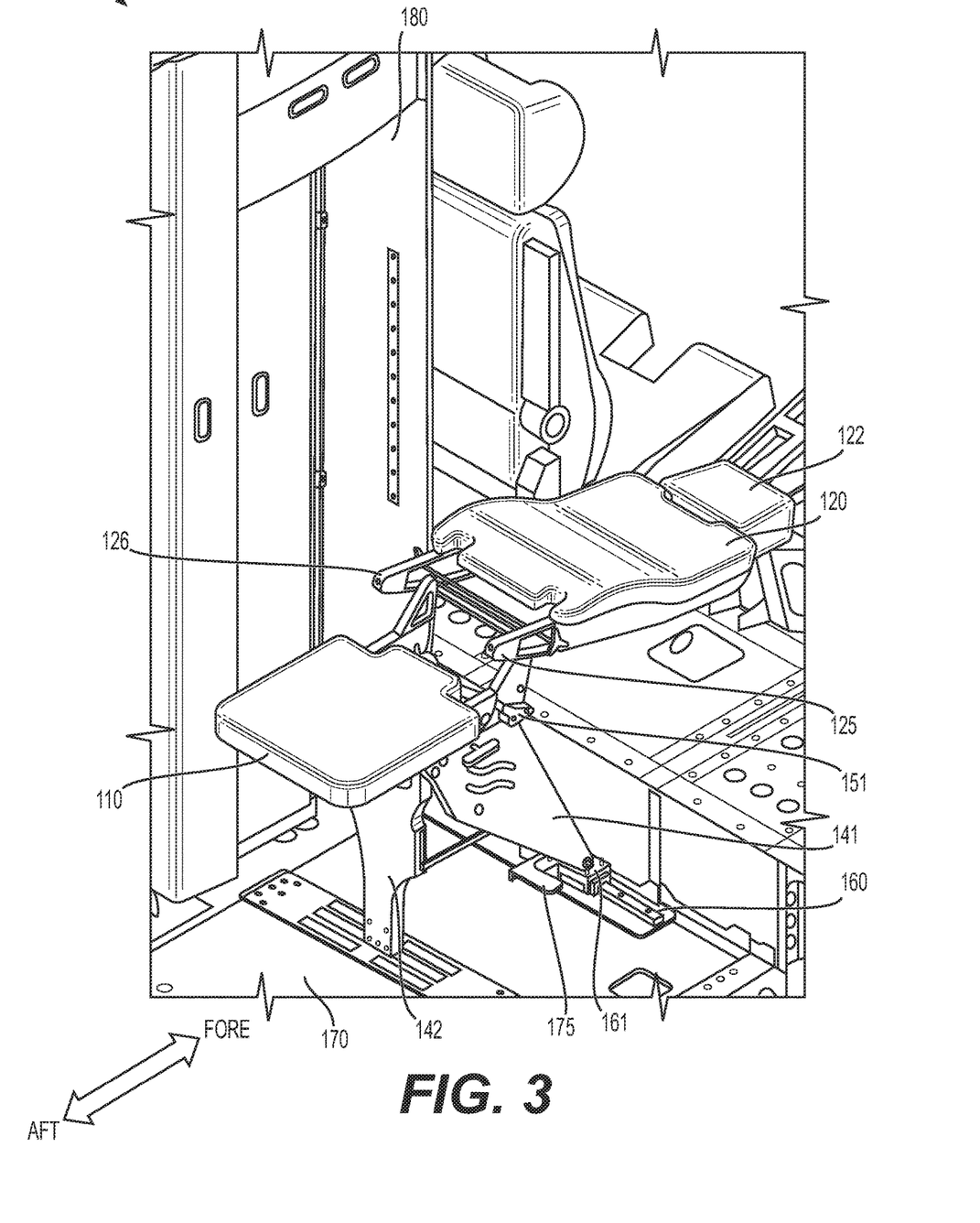
FIG. 3 is a perspective view of the stowable reversible seat of FIG. 1 deployed in an aft-facing direction with the seat back lowered into a second egress position

When seat 100 is oriented in an aft-facing direction, the first egress position is achieved by disengaging first stay 125 from first block 151 such that seat back 120 is free to pivot. Rather than reengaging the pointed end of first stay 125 in another hole or notch of first block 151 (e.g., for transitioning between upright and reclined positions), the pointed end of first stay 125 may be completely disengaged from first block 151, as depicted in FIGS. 2 and 3. This enables seat back 120 to be rapidly lowered from an upright or reclined orientation. Second stay 126 may similarly disengage from a second block not visible in FIG. 2 on the far opposite side of seat 100.

FIG. 3 is a perspective view of stowable reversible seat 100, FIG. 1 deployed in an aft-facing direction with seat back 120 lowered into a second egress position. The second egress position is marked by seat back 120 having been lowered away from seat base 110. The second egress position is attained by releasing first stay 125 from first block 151 as with the first egress position; however, seat back 120 is lowered away from seat base 110 rather than on top of seat base 110. In the second egress position, seat back 120 and/or headrest 122 may contact portions of the cockpit, such as the pedestal and/or monument, that limit pivoting of seat back 120.

FIG. 4 is a perspective view of a stowable reversible seat 100, FIG. 1 folded for stowing. Folding of seat 100 is performed by lifting seat bottom 110 to pivot upward and releasing a first lock 145 via a release handle 146. First lock 145 protrudes from the first end of second leg 142 for inserting into a receptacle 171 in floor 170 for securing thereto, as further described below in connection with FIG. 6. Seat 100 is tilted about carriage plate 161 to a substantially vertical orientation causing second leg 142 to automatically swing to the folded position. Seat 100 is folded to provide a compact profile for fitting inside compartment 180.

Figure 5:
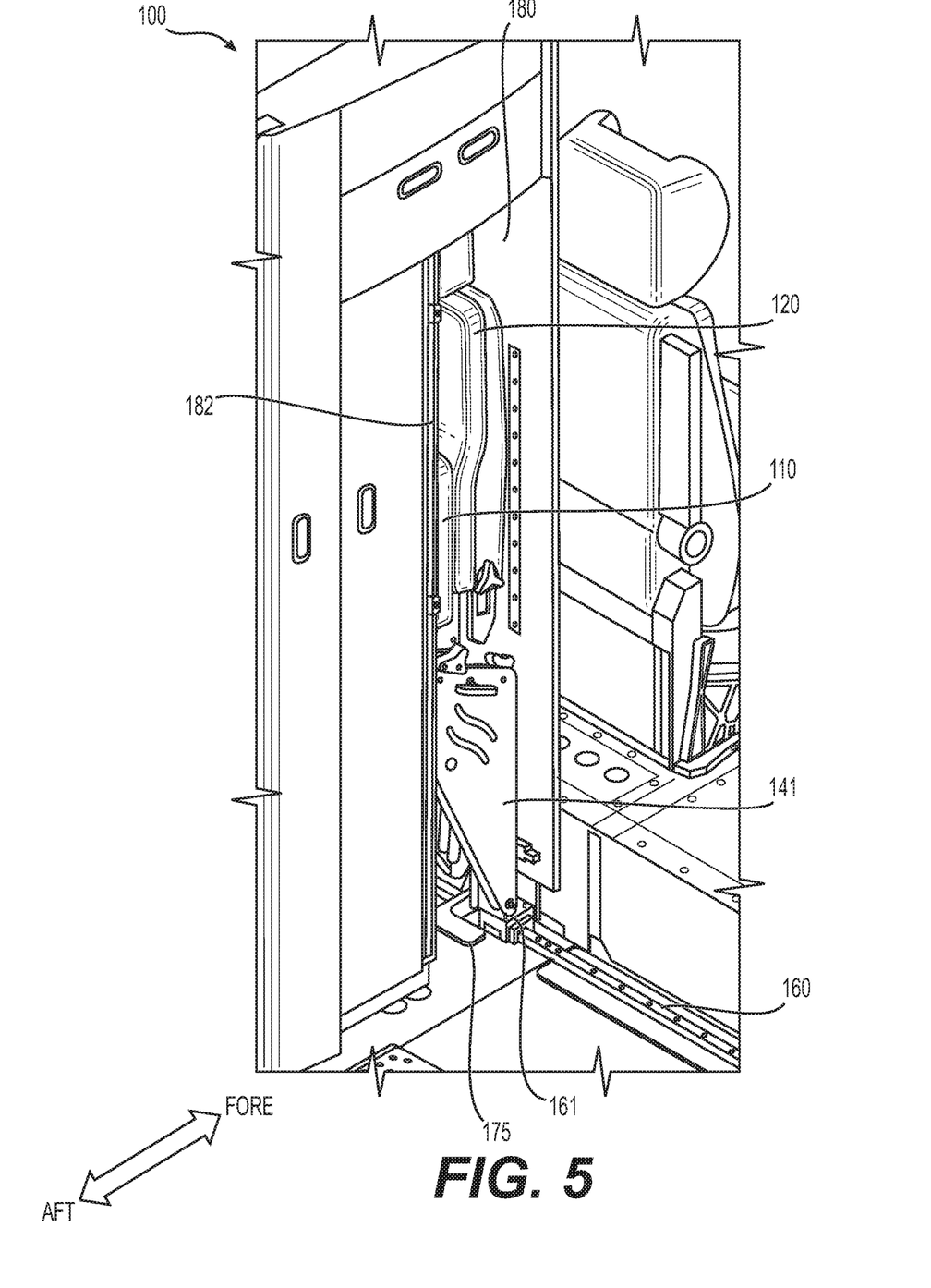
FIG. 5 is perspective view of the stowable reversible seat of FIG. 1 stowed in a compartment in an aft-facing direction, in an embodiment.

FIG. 5 is a perspective view of a stowable reversible seat 100 stowed in compartment 180 in an aft-facing direction. Following release via foot lever 175, carriage plate 161 is slidable along rail 160 for moving seat 100 in and out of compartment 180. As depicted in FIG. 5, seat 100 is folded compactly and positioned along rail 160 inside compartment 180. A compartment door 182 may optionally be configured for confining seat 100 inside compartment 180 and concealing it. Seat 100 is secured inside compartment 180 by locking to rail 160 as described below in connection with FIG. 6.

Figure 6:
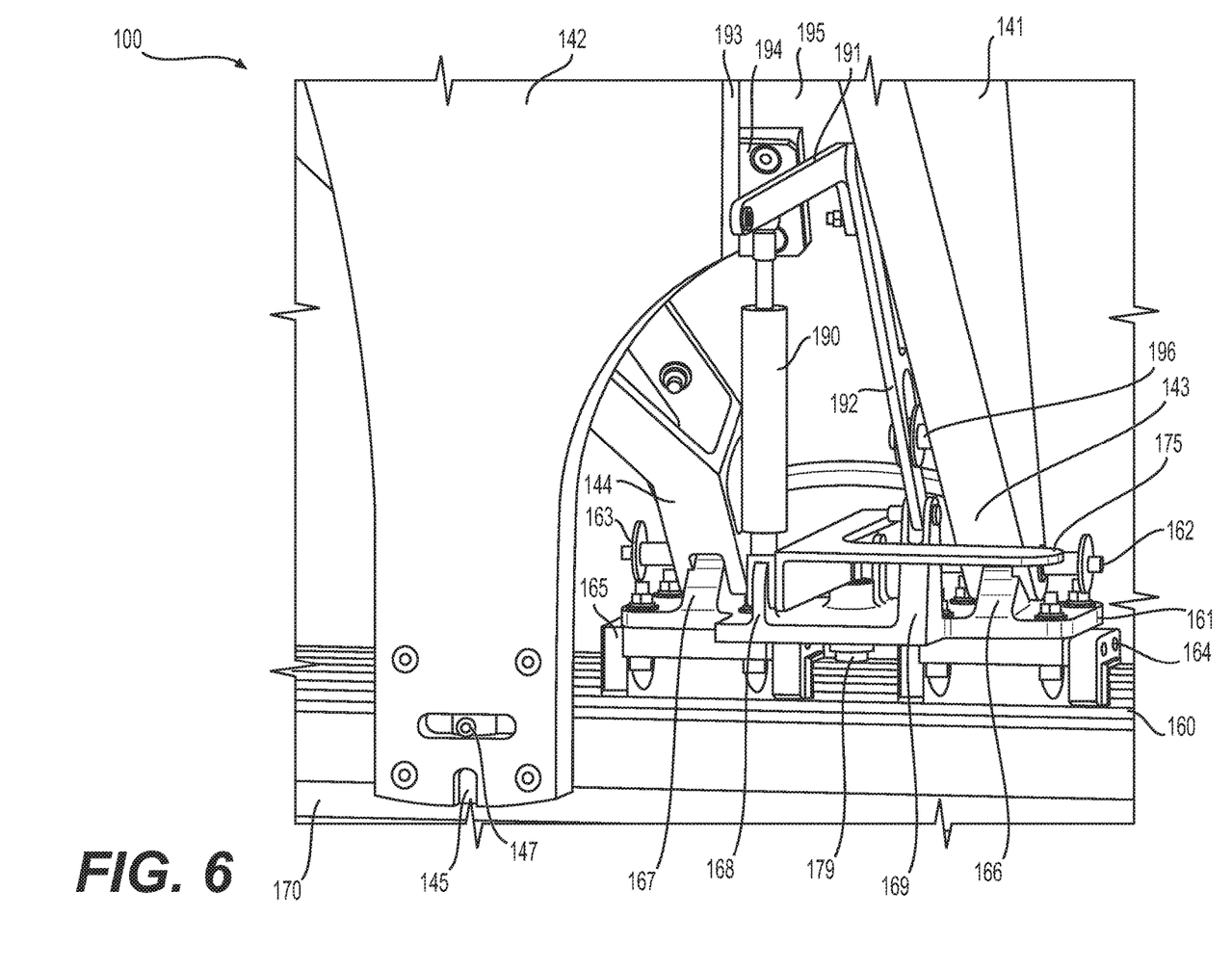
FIG. 6 is a close-up view of a portion of the stowable reversible seat of FIG. 1, in an embodiment.

FIG. 6 is a perspective view of a portion of stowable reversible seat 100, FIG. 1. First leg 141 may pivotally couple to carriage plate 161 via one or more mounts. For example, first leg 141 may couple to a first mount 166 and a second mount 167 via a first extension 143 and a second extension 144, respectively. A brace 195 mechanically couples first extension 143 to second extension 144 to provide additional strength and rigidity to first leg 141. In certain embodiments, first leg 141 and brace 195 are shaped from a single material instead of separate members.

Carriage plate 161 is mechanically coupled to a first carriage 164 and a second carriage 165 that each slide along rail 160. A second lock 179 intervenes with rail 160 to secure carriage plate 161 thereto. Second lock 179 may be biased to automatically insert into a hole or notch of rail 160 when carriage plate 161 is appropriately located. For example, second lock 179 may include a spring-loaded pin that inserts into the hole or notch of rail 160. To release carriage plate 161 for sliding along rail 160, second lock 179 may be retracted from rail 160 against the biasing force. In an embodiment, foot lever 175 engages second lock 179 such that lifting foot lever 175 retracts second lock 179 from rail 160. A first hole is located along rail 160 outside of compartment 180 for securely deploying seat 100 and a second hole is located along rail 160 inside compartment 180 for securely stowing seat 100. Additional holes or notches may be located along rail 160 to provide additional positions for securing seat 100 via second lock 179.

Second leg 142 may be secured to floor 170 using first lock 145 located inside the first end of second leg 142. First lock 145 may be mechanically coupled to a release mechanism, such as a release lever, cable, or the like. In an embodiment, first lock 145 is released by twisting and pulling up on release handle 146, as further described below. First lock 145 may be biased for automatically protruding out of the second end of second leg 142 and configured to insert into receptacle 171, FIG. 4 of floor 170. For example, first lock 145 may include a spring-loaded pin that inserts into receptacle 171. Receptacle 171 may be a hole or insert configured to receive the protruding end of first lock 145 for securing in place. In certain embodiments, first lock 145 further includes a radial extension 147 for securing second leg 142 to floor 170. First lock 145 is twistable via twisting of release handle 146 such that radial extension 147 latches within receptacle 171 and unlatches from receptacle 171 upon twisting.

Carriage plate 161 includes a first mount 166 for receiving first extension 143 of first leg 141 such that first extension 143 straddles first mount 166. A first mount pin 162 is configured to pass through first extension 143 and first mount 166 to secure first extension 143 to carriage plate 161. First mount pin 162 serves as a pivot axis for first extension 143 to rotate about. A second extension 144 of first leg 141 is similarly configured to straddle a second mount 167 of carriage plate 161 and rotate about a second mount pin 163. First mount pin 162 and second mount pin 163 may be quick-release pins that are removable by hand to enable removal of seat 100 from the vehicle without the use of tools. Seat 100 may be removed from an aircraft to reduce weight and increase storage capacity, for example.

Figure 7:
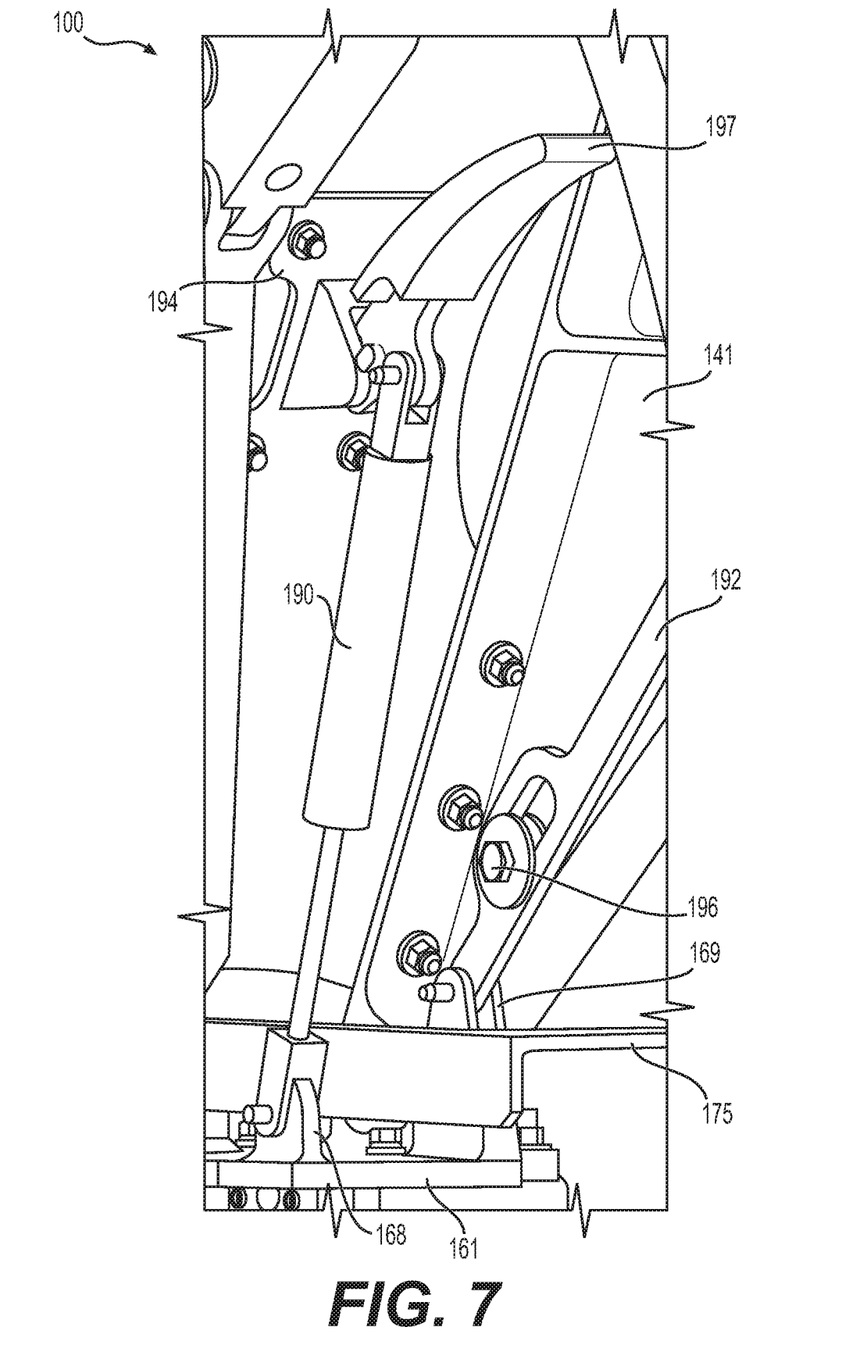
FIG. 7 is another close-up view of a portion of the stowable reversible seat of FIG. 1, in an embodiment.

FIG. 7 shows a perspective view of a strut 190 for automatically folding seat 100. FIGS. 6 and 7 are best viewed together with the following description. Strut 190 is for example a gas strut, gas spring, compression spring, or the like configured for providing a force used to effect displacement along its longitudinal axis. A first end of strut 190 may be pivotably mounted to carriage plate 161 via a third mount 168. A second end of strut 190 may be pivotably coupled to brace 195 via a bracket 194. As depicted in FIG. 7, a quick-release handle 197 may be provided to assist with removal of seat 100 from the vehicle without the use of tools.

Referring again to FIG. 6, a linkage is formed from a first bar 191 pivotably coupled to a second bar 192. The linkage mechanically couples first leg 141 to second leg 142 for retraction of second leg 142 when seat 100 is folded. First bar 191 has a first end mechanically coupled to a slot 193 of second leg 142 for sliding within, and a second end pivotably coupled to second bar 192. Second bar 192 is pivotably mounted to carriage plate 161 via a quick-release pin through second bar 192 and a fourth mount 169. A bolt 196 is mechanically coupled to first leg 141 and aligned through a slot of second bar 192 for coupling movement between first leg 141 and second bar 192.

In operation from the deployed position, seat 100 may be folded after first lock 145 is released from receptacle 171, which is further described below in connection with FIG. 8. Seat base 110 is lifted up and strut 190 extends and pushes brace 195 upward. As brace 195 moves upward, it causes first leg 141 to pivot upright in the fore direction. Meanwhile, the linkage formed of first bar 191 and second bar 192 couples movement of first leg 141 to second leg 142, thereby pulling second leg 142 for automatically folding into a collapsed position (e.g., as depicted in FIG. 4).

In operation, seat 100 may be deployed from the folded position by lowering seat base 110 and leaning seat 100 in the aft direction, causing strut 190 to compress and the linkage formed of first bar 191 and second bar 192 to unfold. Meanwhile, second leg 142 swings down and away from first leg 141. The linkage formed of first bar 191 and second bar 192 aligns first lock 145 with receptacle 171 in floor 170. First lock 145 may engage with receptacle 171, as described below in connection with FIG. 8.

Figure 8:
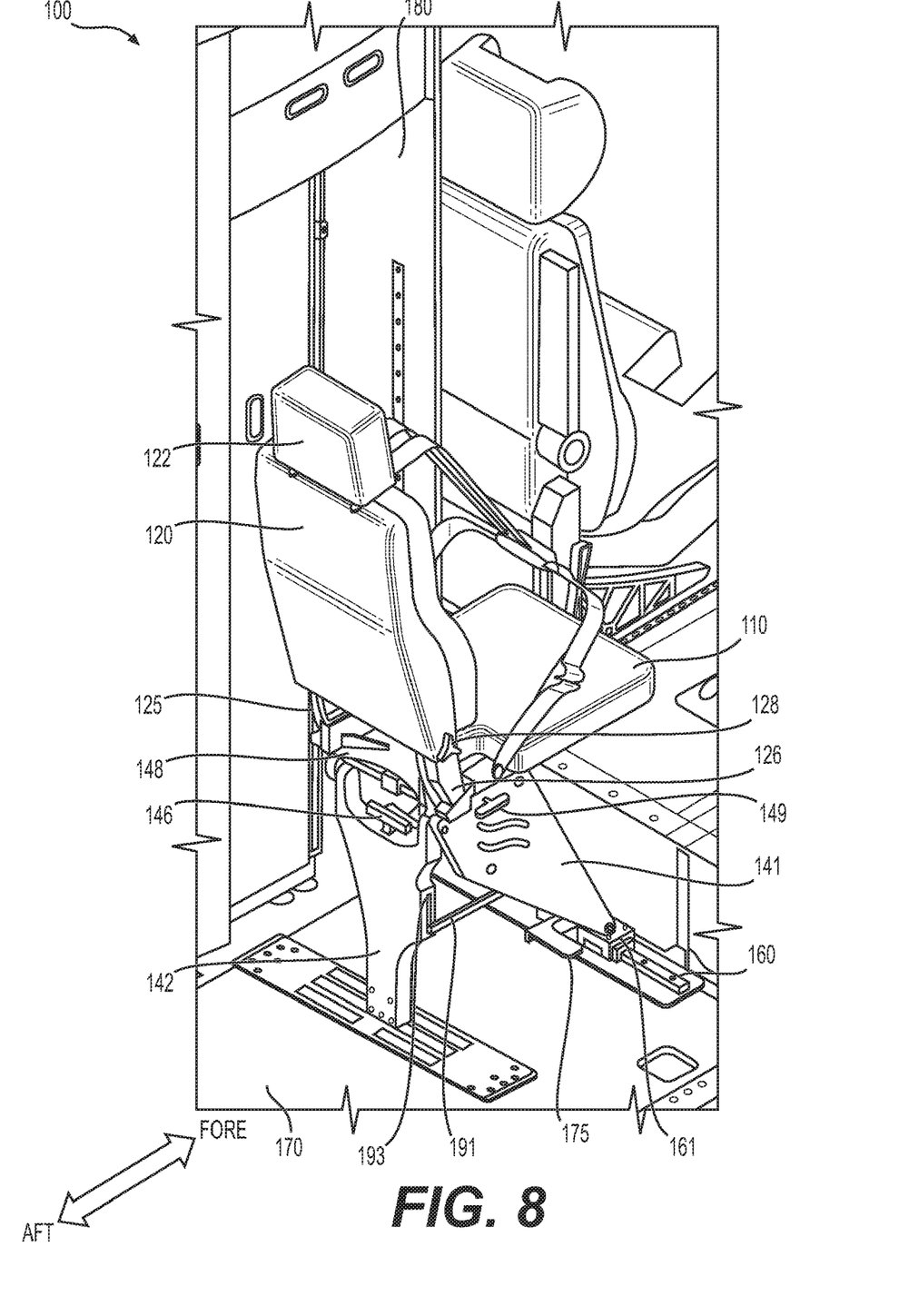
FIG. 8 is a perspective view of the stowable reversible seat of FIG. 1 deployed in a forward-facing direction, in an embodiment.

FIG. 8 is a perspective view of stowable reversible seat 100, FIG. 1 deployed for sitting in a forward-facing direction. Due to the reverse orientation of seat back 120 compared to the aft-facing configuration shown in FIG. 1, second stay 126 engages first block 151, while first stay 125 may optionally engage a second block on the opposite side of first leg 141. A release handle 146 is attached to second leg 142 and mechanically coupled to first lock 145 for a user to release first lock 145 from receptacle 171, thereby releasing second leg 142 from floor 170. Release handle 146 may be used to rotate first lock 145 for transitioning between locked and unlocked orientations. For example, release handle 146 may be rotated approximately ninety degrees causing radial extension 147 (see FIG. 6) to correspondingly rotate, thereby securely latching into receptacle 171. Similarly, release handle 146 may be counter-rotated approximately ninety degrees causing radial extension 147 to correspondingly counter-rotate and unlatch first lock 145 from receptacle 171.

In certain embodiments, a swivel plate 148 may be used to reverse the orientation of seat 100 from aft-facing to forward-facing. Swivel plate 148 provides a rotational coupling that allows seat base 110 and seat back 120 to rotate with respect to first leg 141 and second leg 142 (e.g., between forward and aft-facing directions). Specifically, swivel plate has a lower portion pivotably coupled to first leg 141 and an upper portion upon which seat frame 112 mounts, with seat base 110 and seat back 120 each pivotably coupled to seat frame 112. The lower and upper portions of swivel plate 142 may rotate with respect to one another and may be locked by a locking mechanism to prevent rotation.

A swivel lever 149 is coupled to the locking mechanism for locking swivel plate 148 in a predetermined orientation.

Figure 9:
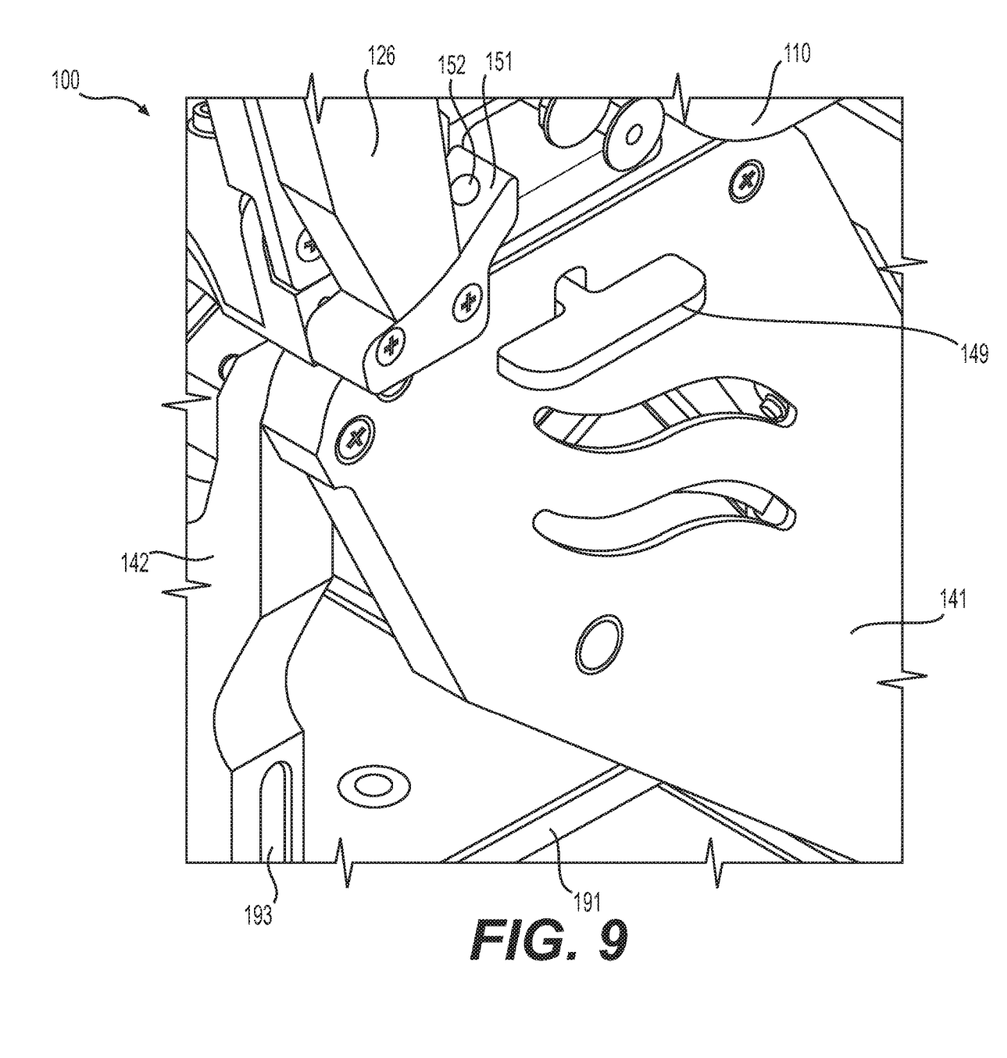
FIG. 9 is a close-up perspective view of a portion of the stowable reversible seat of FIG. 1, in an embodiment.

FIG. 9 shows a close-up perspective view of swivel lever 149. In operation, swivel lever 149 may be lifted to release the locking mechanism, freeing swivel plate 148 for rotation. Also viewable in FIG. 9 is a second notch 152 of first block 151 for receiving the pointed end of second stay 126 for orienting seat back 120 in a reclined position. A first notch 150, which is not visible in FIG. 9 (see FIG. 11), engages the pointed end of second stay 126 for securing seat back 120 in the upright orientation depicted in FIG. 9.

In an alternative embodiment, the reverse orientation of seat 100 is accomplished by removing seat base 110 and seat back 120, rotating their orientation approximately 180 degrees, then reattaching seat base 110 and seat back 120. For example, seat base 110 may be mechanically coupled to first leg 141 with one or more bolts, and seat back 120 may be coupled to first leg 141 with one or more bolts. The same bolts may be reused and simply inserted after reversing orientation of seat base 110 and seat back 120.

Figure 10:
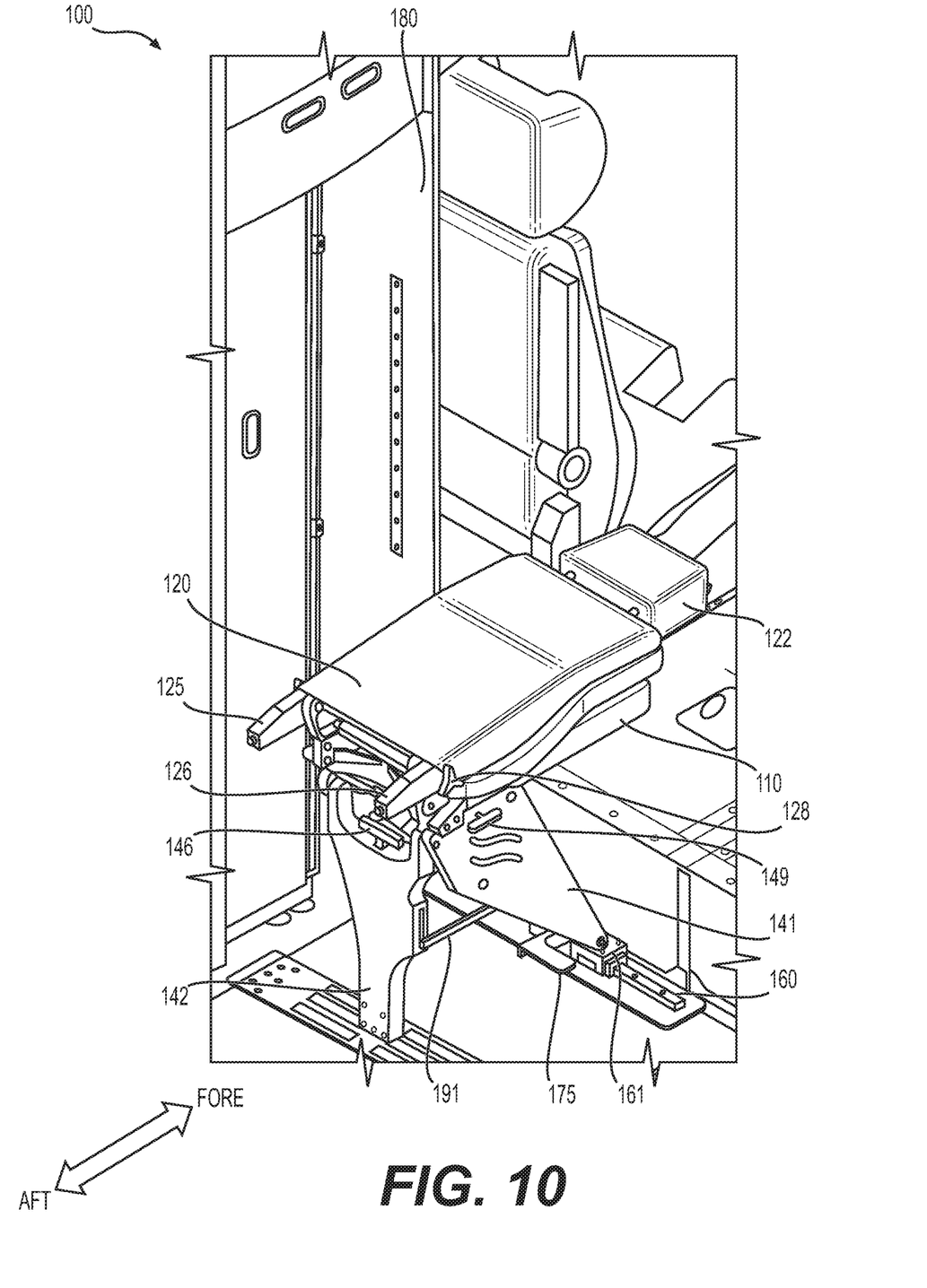
FIG. 10 is a perspective view of the stowable reversible seat of FIG. 1 deployed in a forward-facing direction with the seat back lowered into the first egress position, in an embodiment.
Figure 11:
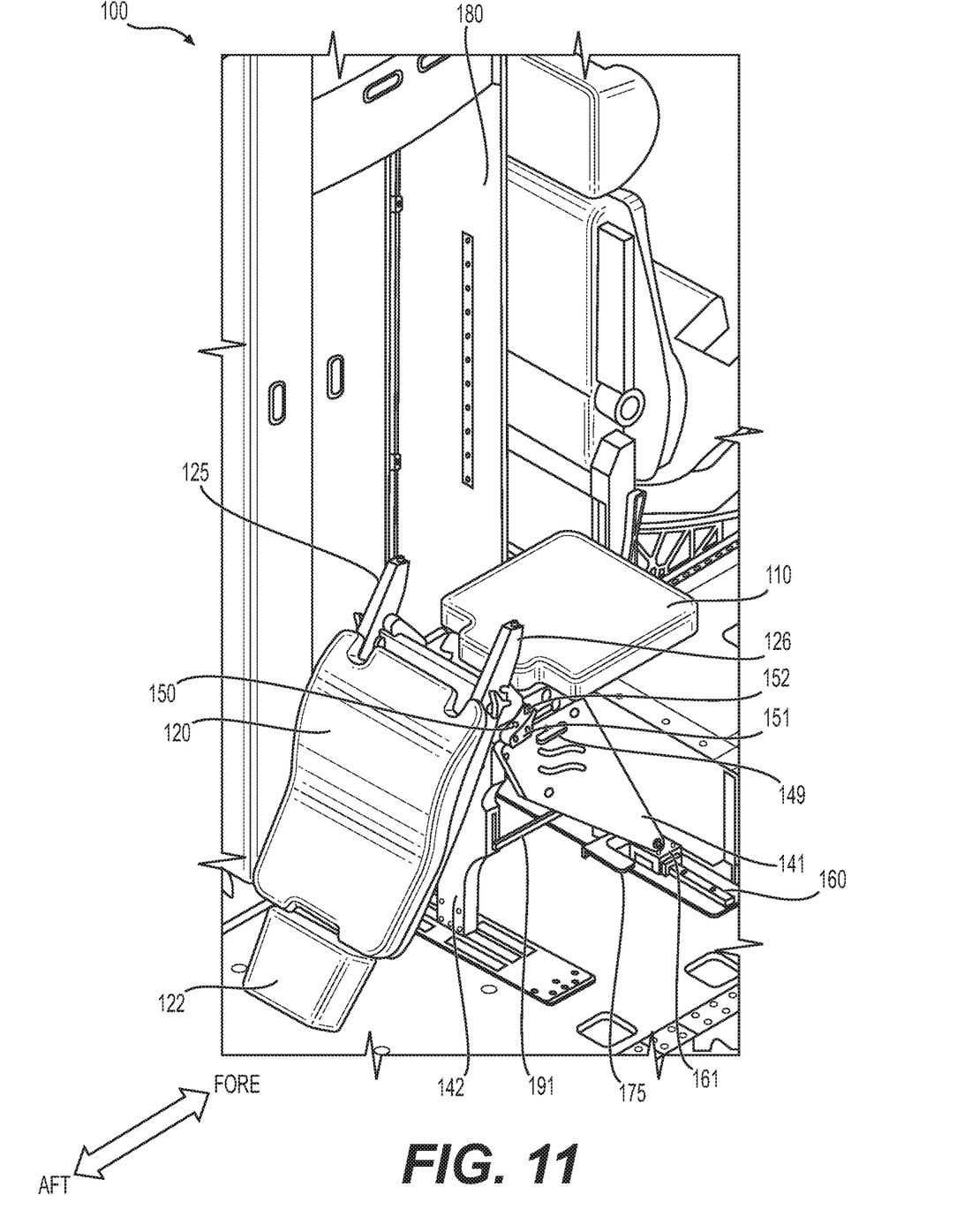
FIG. 11 is a perspective view of the stowable reversible seat of FIG. 1 deployed in a forward-facing direction with the seat back lowered into the second egress position, in an embodiment.

FIG. 10 is a perspective view of stowable reversible seat 100 deployed in a forward-facing direction with seat back 120 lowered into the first egress position. As in FIG. 2, the first egress position is marked by seat back 120 laying on top of seat base 110. When seat 100 is oriented in a forward-facing direction, the first egress position is achieved by disengaging second stay 126 from first block 151 such that seat back 120 is free to pivot. Rather than reengaging the pointed end of second stay 126 in another notch of first block 151 (e.g., notch 152 for transitioning seat back 120 from an upright position to a reclined position), the pointed end of second stay 126 may be completely disengaged from first block 151, as depicted in FIGS. 10 and 11. This enables seat back 120 to be rapidly lowered from a generally vertical orientation. First stay 125 may similarly disengage from a second block not visible in FIG. 10 on the far opposite side of seat 100.

FIG. 11 is a perspective view of a stowable reversible seat 100 deployed in a forward-facing direction with seat back 120 lowered into the second egress position. The second egress position is attained by releasing second stay 126 from first block 151 such that seat back 120 is lowered away from seat base 110, rather than on top of seat base 110 as in the first egress position of FIG. 10. In the second egress position, seat back 120 may pivot until headrest 122 contacts floor 170, as depicted in FIG. 11. The first notch 150, which is used to engage the pointed end of second stay 126 for securing seat back 120 in the upright orientation depicted in FIG. 9, is visible while seat back 120 is lowered in the second egress position, as shown in FIG. 11.

Figure 12:
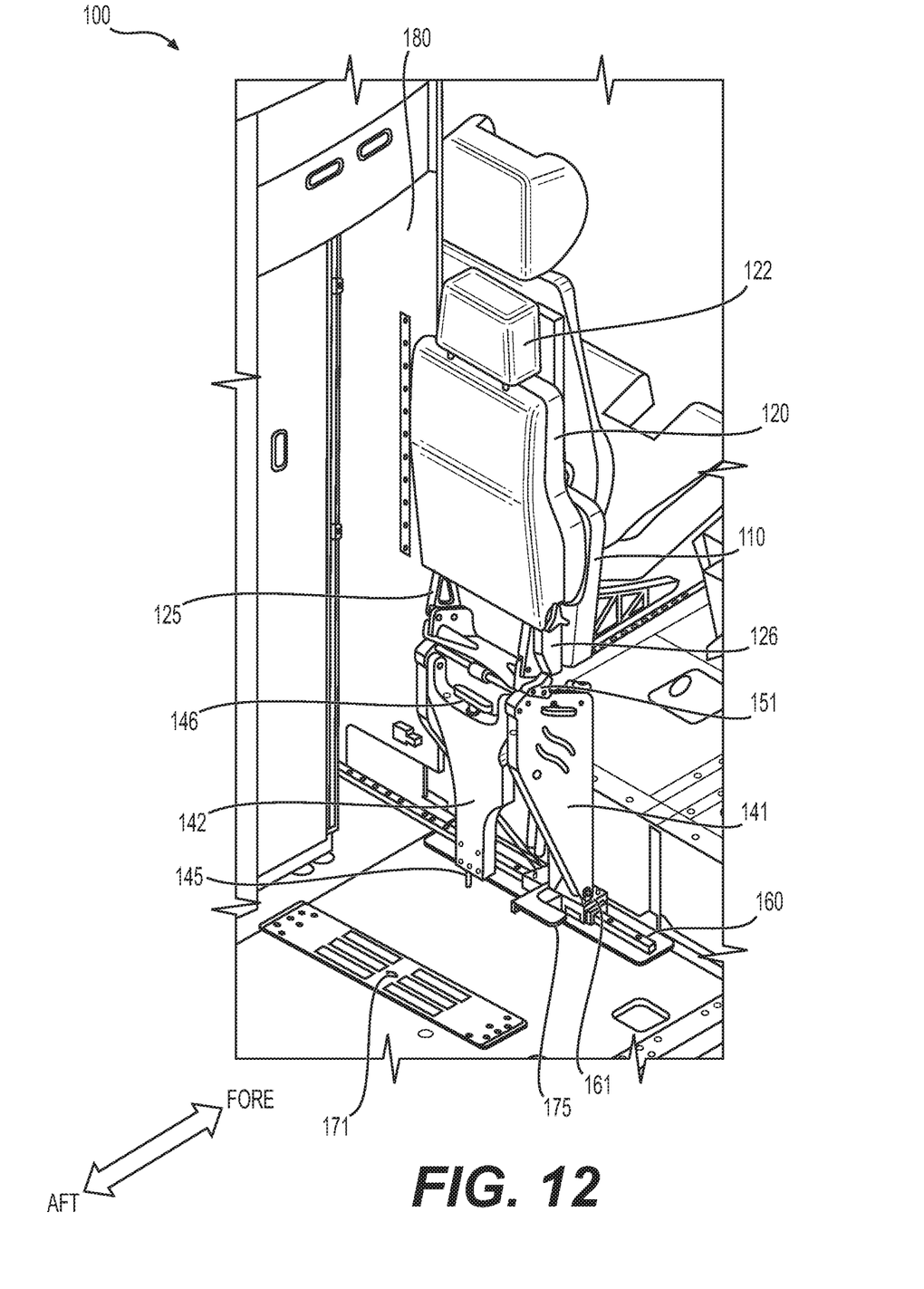
FIG. 12 is a perspective view of the stowable reversible seat of FIG. 1 folded for stowing in a forward-facing direction, in an embodiment.

FIG. 12 is a perspective view of stowable reversible seat 100 folded for stowing in a forward-facing direction. Folding of seat 100 is performed by lifting seat bottom 110 to pivot upward and releasing lock 145 from receptacle 171 via release handle 146. Second leg 142 collapses, while first leg 141 is pivoted via carriage plate 161 to tilt seat 100 to a substantially vertical orientation. Second leg 142 may be automatically retracted while folding seat 100 via strut 190 together with the linkage formed by first bar 191 and second bar 192 (see FIG. 6).

Figure 13:
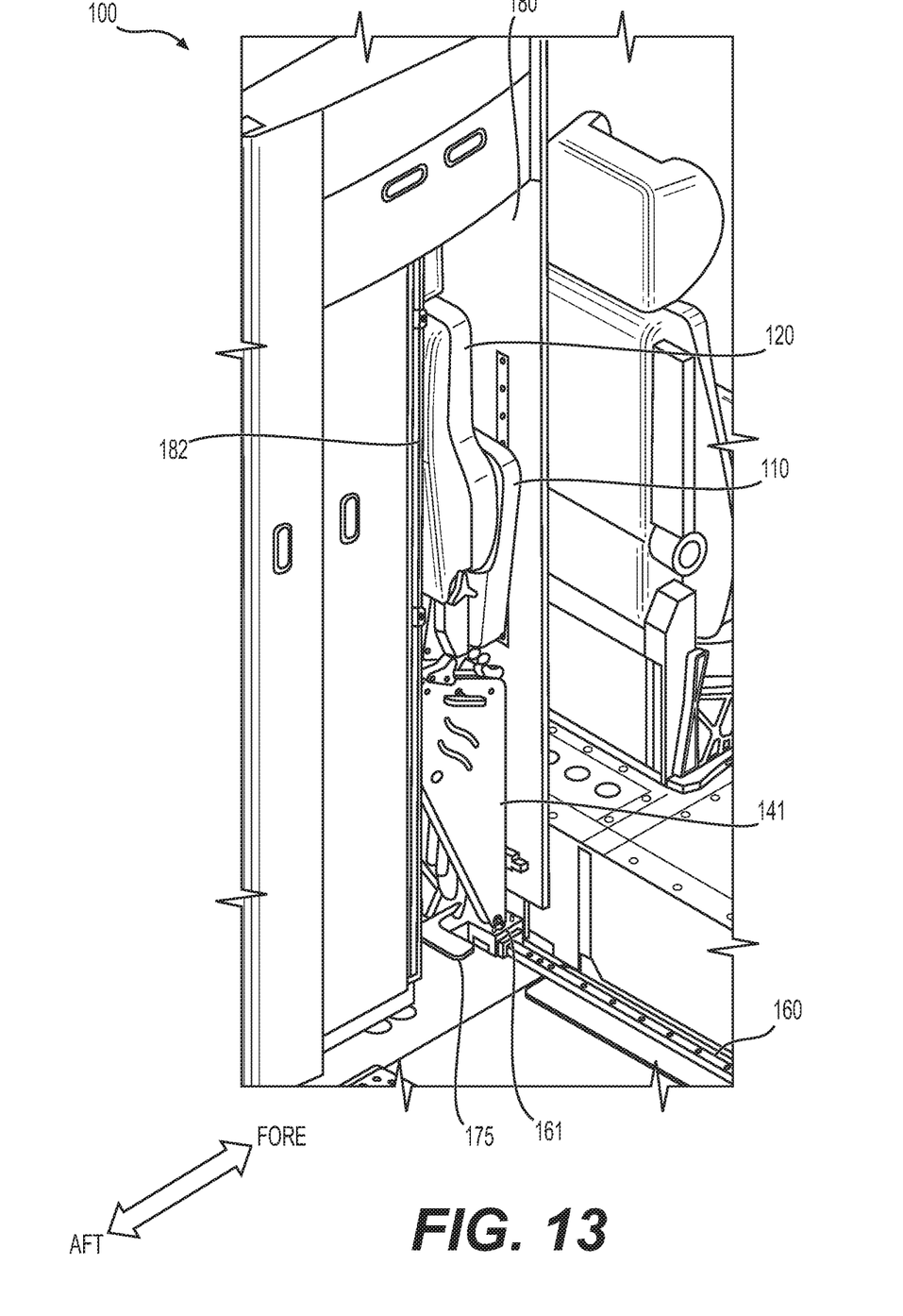
FIG. 13 is a perspective view of the stowable reversible seat of FIG. 1 stowed in a compartment in a forward-facing direction, in an embodiment.

FIG. 13 is a perspective view of stowable reversible seat 100 stowed in compartment 180 in a forward-facing direction. After folding of seat 100, stowing is performed by sliding seat 100 along rail 160 into compartment 180. When fully stowed, lock 145 automatically inserts into a hole or notch of rail 160 for securing seat 100 inside compartment 180. A compartment door 182 may be closed to conceal the stowed seat.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

I claim:

1. A stowable reversible seat for a vehicle, comprising:
a first member pivotally coupled to a floor for supporting a seat base;
a second member releasably secured to the floor for supporting the seat base; and
a seat back pivotally coupled to the first member, wherein the first member, the second member, the seat base, and the seat back pivot between a folded configuration for stowing and a deployed configuration for seating; and
wherein the seat base and seat back are reversible for switching between a forward-facing direction of the vehicle and an aft-facing direction of the vehicle.

2. The stowable reversible seat of claim 1, wherein the second member is releasably coupled to the floor via a releasable locking mechanism that inserts into a receptacle in the floor.

3. The stowable reversible seat of claim 2, the releasable locking mechanism further comprising a radial extension that latches within the receptacle and unlatches from the receptacle by twisting of a release handle mechanically coupled to the releasable locking mechanism.

4. The stowable reversible seat of claim 1, wherein the first member pivotally attaches to a carriage via a quick-release pin, the carriage being slidable along a rail secured to the floor.

5. The stowable reversible seat of claim 4, wherein the carriage comprises a biased locking member that intervenes with the rail to secure the carriage thereto.

6. The stowable reversible seat of claim 5, wherein the carriage comprises a foot lever for lifting the biased locking member for disengaging from the rail thereby enabling the carriage to slide along the rail.

7. The stowable reversible seat of claim 6, wherein the rail extends from a cabinet into an aisle such that the seat may be slid along the rail for stowing in the cabinet and for deploying in the aisle.

8. The stowable reversible seat of claim 4, further comprising a strut coupled between the first member and the carriage and a linkage that pivotably couples the first member to the second member for assisting with folding of the seat.

9. The stowable reversible seat of claim 1, wherein the seat back comprises a longitudinally-aligned stay having a pointed end that inserts into a first notch of a block mounted to the first member for maintaining the seat back in a first position for upright seating, and a second notch of the block for maintaining the seat back in a second position for reclined seating.

10. The stowable reversible seat of claim 9, wherein the longitudinally-aligned stay disengages from the block for enabling the seat back to pivot to a third position for egress.

11. A method of configuring a seat into an aircraft, the aircraft having a concealed cabinet area and an aisle to provide an egress path for a pilot, the method comprising:
   adapting the cabinet area to receive and conceal the seat;
   configuring a rail to make the seat slidable out from the cabinet area into the aisle;
   establishing a releasable locking mechanism for enabling the seat to be secured inside the cabinet or in the aisle, and for the seat to slide between the cabinet area and the aisle;
   attaching a pivotable seat base on the seat; and
   pivotally mounting a supporting leg underneath a portion of the seat to secure the pivotable seat base in a substantially horizontal position.

12. The method of claim 11 comprising: securing the supporting leg to the floor by inserting a protruding member from a first end of the supporting leg into a receptacle in the floor and twisting the protruding member via a release handle to latch within the receptacle.

13. The method of claim 11, further comprising reversing an orientation of the seat by releasing a swivel plate for rotating the pivotable seat base and a seat back that are both mechanically coupled to the swivel plate.

14. The method of claim 11, further comprising lowering the seat back to provide an egress configuration enabling the pilot to climb over the seat in the event of an emergency exit.

15. A stowable reversible seat for a vehicle, comprising:
   a track extending along a floor of the vehicle between a compartment and an aisle;
   a forward leg member supporting a flip-down seat base, the forward leg member being slidably received into the track such that the seat can be one of: (i) stowed in the compartment, or (ii) slid out into a deployed position;
   a seat back that locks into an upright position for seating; and
   a rear leg member hinged to one of the forward leg member or the seat base, the rear leg member being plantable in a relatively rearward location on a support surface, the rear leg member thus providing rearward support for the seat when the seat is in the deployed position.

16. The stowable reversible seat of claim 15, further comprising a seat stay longitudinally aligned with the seat back, the seat stay having a retractable pointed end that inserts into one or more holes of a block attached to the forward leg member such that the seat stay may pivot to adjust the orientation of the seat back between the upright position and one or more reclined positions.

17. The stowable reversible seat of claim 16, wherein the seat stay may disengage from the block to enable the seat back to lower for providing a first egress configuration in which the seat back substantially lies on the seat base.

18. The stowable reversible seat of claim 16, wherein the seat stay may disengage from the block to enable the seat back to lower for providing a second egress configuration in which the seat back lowers away from the seat base.

19. The stowable reversible seat of claim 15, further comprising a swivel plate that mechanically couples the forward leg member and the rear leg member with the seat base and the seat back to enable rotation of the seat base and seat back for converting between a forward-facing seat and a rearward-facing seat.

20. The stowable reversible seat of claim 15, wherein the seat may be removed from the vehicle by detaching from the track without the use of tools.

21. A stowable reversible seat for a vehicle, comprising:
   a first member pivotally coupled to a floor for supporting a seat base;
   a second member releasably secured to the floor for supporting the seat base;
   a seat back pivotally coupled to the first member, wherein the first member, the second member, the seat base, and the seat back pivot between a folded configuration for stowing and a deployed configuration for seating; and
   wherein the seat base and seat back are reversible for switching between a first direction and a second direction, opposite the first direction.

* * * * *